United States Patent [19]

Iimura

[11] Patent Number: 4,624,809
[45] Date of Patent: Nov. 25, 1986

[54] METHOD AND APPARATUS FOR FORMING UPPER STEPS OF A CONCEALED TYPE SLIDE FASTENER

[75] Inventor: Yoshitaka Iimura, Toyama, Japan
[73] Assignee: Yoshida Kogyo K.K., Tokyo, Japan
[21] Appl. No.: 663,373
[22] Filed: Oct. 22, 1984
[30] Foreign Application Priority Data
Oct. 11, 1983 [JP] Japan ................................. 58-211275
[51] Int. Cl.⁴ .......................... B29C 65/08; B29D 5/00
[52] U.S. Cl. ........................................ 264/23; 24/436; 29/767; 156/73.1; 156/73.2; 156/261; 156/518; 156/580.1; 156/583.1; 264/163; 264/252; 425/174.2; 425/814
[58] Field of Search ................... 156/73.1, 73.2, 580.1, 156/580.2, 261, 518, 583.1; 264/23, 252, 163; 425/174.2, 814; 24/436; 29/408, 767

[56] References Cited

U.S. PATENT DOCUMENTS

| | | | |
|---|---|---|---|
| 3,672,008 | 6/1972 | Moertel et al. | 24/436 |
| 4,163,768 | 8/1979 | Stephens | 264/23 |
| 4,217,685 | 8/1980 | Seki | 29/767 |
| 4,332,071 | 6/1982 | Takahashi | 29/767 |

FOREIGN PATENT DOCUMENTS 55-101204 8/1980 Japan .

Primary Examiner—Michael Wityshyn
Attorney, Agent, or Firm—Hill, Van Santen, Steadman & Simpson

[57] ABSTRACT

The invention provides method and apparatus for forming upper stops of a concealed type slide fastener. A concealed type slide fastener comprises a pair of fastener stringers each consisting of a fastener tape having a turn-up along one side thereof and fastener elements of thermoplastic resin secured to the turn-up. Portions of the elements are fused to form upper stops. In the method and apparatus of the invention, a pair of spaced projections are formed on a base and placed with respect to fastener stringers of a slide fastener or continuous fastener chain so that the projections pass between the stringers. The fastener elements are urged toward the projections while portions of the projections engage the arrest the element-mounting-side margins of the tapes to expose the interengaging heads of the elements so that only the interengaging heads are fused.

5 Claims, 11 Drawing Figures

METHOD AND APPARATUS FOR FORMING UPPER STEPS OF A CONCEALED TYPE SLIDE FASTENER

BACKGROUND OF THE INVENTION

This invention relates to method and apparatus for forming upper stops of a concealed type slide fastener by fusing a portion of fastener elements on the pair of right and left fastener stringers of the slide fastener.

Consealed type slide fasteners are produced generally by making a pair of right and left fastener stringers each comprising a fastener tape having a turn-up along one side to which a row of fastener elements are secured, interengaging these fastener stringers into a fastener chain, removing the fastener elements at a predetermined spacing to form spaces, threading a slider through a space onto the elements, then, first forming a bottom stop and thereafter forming upper stops, and finally cutting the chain at the space to complete a slide fastener of a predetermined length.

In such process for producing concealed type slide fasteners as noted above, the upper stops are formed in such a way that, in an effort to prevent the turn-up from sticking to the main portion of the fastener tape by the effect of melted synthetic resin, the turn-ups are straightened back and the fastener elements, auxiliary stock of upper stop material and the strightened turn-ups are altogether clamped between an ultrasonic horn and a die for fusing them by heat. This kind of process for forming upper stops is disclosed, for example, in Japanese Patent Public Disclosure No. 101204/1980. However, even in this process, the turn-ups of the fastener tapes are clamped between the ultrasonic horn and the die together with the elements and the auxiliary stock. Therefore, there are such drawbacks that the woven yarns of the turn-ups melt or the liquid of the melted elements and the auxiliary stock infiltrate into the turn-ups and the threads with which coils of the fastener elements are sewn to the fastener tapes, making the turn-ups and the sewing threads fragile and lessening the value of the products.

SUMMARY OF THE INVENTION

Therefore, it is an object of the invention to provide method and apparatus for forming upper stops of concealed type slide fasteners which make it possible to easily form the upper stops without making the turn-ups of fastener tapes and sewing threads fragile.

According to the invention, the method comprises the steps of providing a pair of spaced projections on a base, placing the projections so that the projections pass between a pair of stringers, urging the fastener elements secured on each of the fastener stringers in the direction away from the leg portions and towards the interengaging heads of the elements with the element-mounting-side margin of the fastener tape of each stringer engaged and arrested by the associated side portions of the projections thereby exposing the interengaging heads from the margin, and fusing the fastener elements extending between the projections to form the upper stops.

According to the invention, the apparatus comprises means for transporting a fastener chain in a predetermined path, a base provided along the path of the fastener chain for vertical movement towards and away from the fastener chain and having a pair of guide channels vertically formed in the base on the opposite sides of the centerline of the path of the fastener chain, punches mounted for vertical movement in the guide channels, respectively, an ultrasonic horn provided on the side opposite to the base with respect to the path of the fastener chain and for vertical movement, projections formed on the base on the upstream and downstream sides of the guide channels such that the projections are inserted between the pair of stringers of the fastener chain when the base is raised, and hammers provided on the opposite sides of the path of the fastener chain and each having a punch portion overlying the base and reciprocating towards and away from the projections such that when it moves towards the projections it urges the elements secured to the fastener stringer in the direction away from the leg portions and towards the interengaging heads of the elements. According to the invention, the projections have portions which engage and arrest the element-mounting-side margins of the fastener tapes of the stringers when the elements are urged towards the projections and the ultrasonic horn has portions which press the elements extending between the projections against the punches in their raised position.

BRIEF DESCRIPTION OF THE DRAWINGS

The invention will now be described in more detail with reference to the accompaying drawings in which.

DESCRIPTION OF THE PREFERRED EMBODIMENTS

Figure 1:
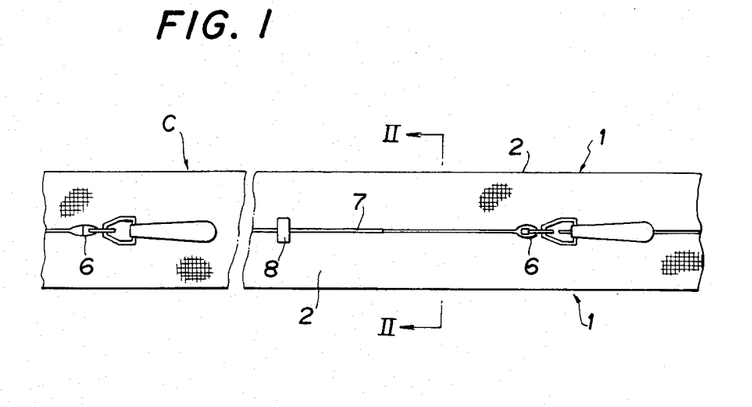
FIG. 1 is a plan view of a fastener chain for concealed type slide fasteners.
Figure 2:
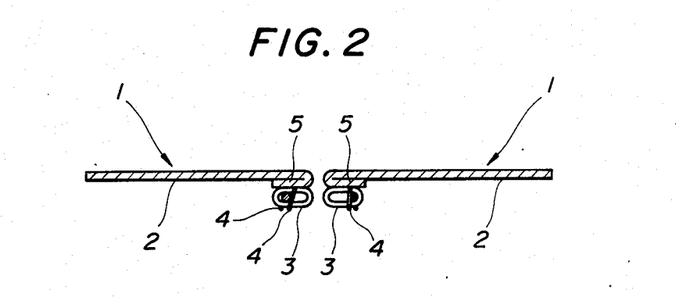
FIG. 2 is a sectional view of the fastener chain taken along the line II—II.

FIGS. 1 and 2 show a fastener chain C for concealed type slide fasteners in a state before upper stops have been formed thereon. The fastener chain C consists of a pair of fastener stringers 1 each comprising a fastener tape 2 having a turn-up 5 along one side of the tape and a coil 3 of thermoplastic resin having integrally formed fastener elements and sewn to the turn-up with threads 4. A slider 6 is threaded through the row of elements and bottom stops 8 are formed on the chain spaced by a predetermined distance along the length thereof. The bottom stops are formed by mounting metal stop members to the chain C such that each of them straddles both stringers 1.

Figure 3:
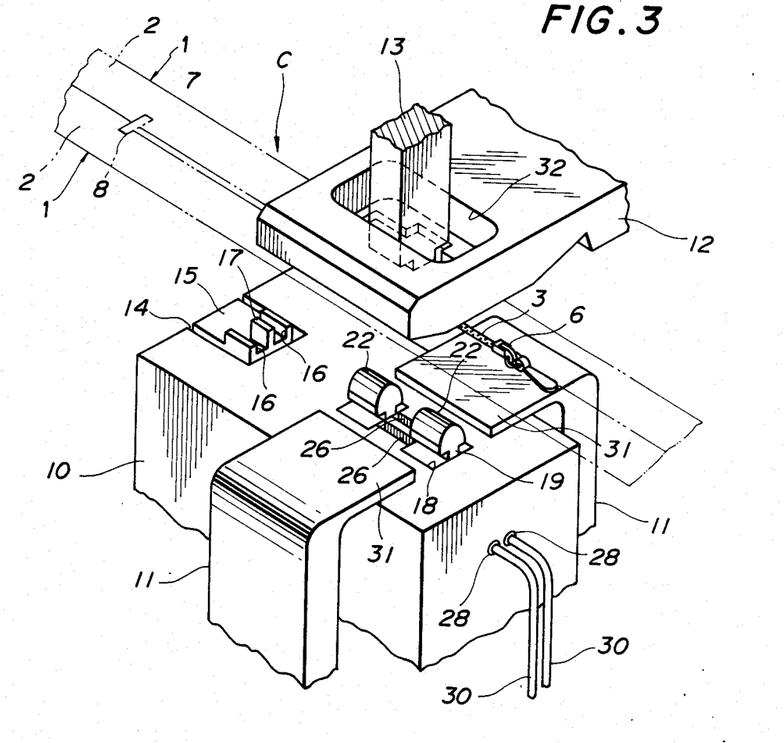
FIG. 3 is a perspective view of an upper stop forming apparatus according to the invention.
Figure 4:
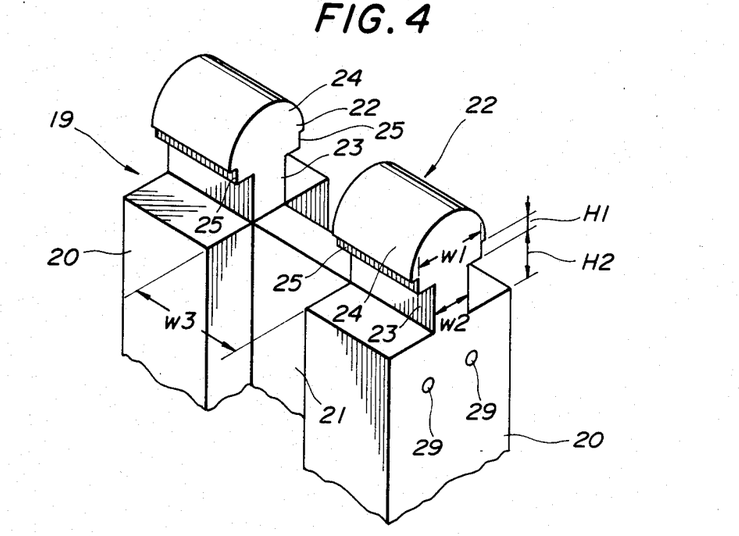
FIG. 4 is a perspective view of a punch guide used in the apparatus shown in FIG. 3.
Figure 5:
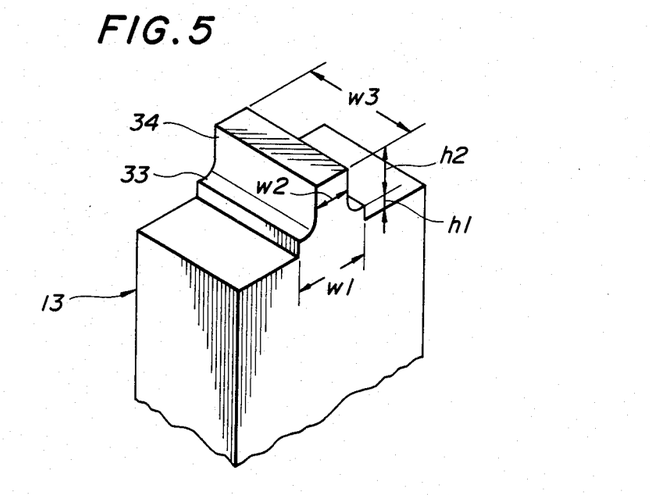
FIG. 5 is a perspective view of an ultrasonic horn used in the apparatus shown in FIG. 3.

With reference to FIGS. 3 to 5, an upper stop forming apparatus comprises a base 10 of a rectangular parallelepiped, a pair of hammers 11 provided on the opposite sides of the base 10 for reciprocal movement transversely to the longitudinal direction of the base and each having a portion overlying the upper surface of the base, a chain guide 12 generally having the configuration of a flat plate and placed above the base 10, and an ultrasonic horn 13 which can extend through the chain guide 12 beyond the side of the chain guide facing the base.

The base 10 has a cavity 14 at the upstream end thereof (with respect to the movement of the fastener chain) and the cavity is provided with a stopper 15 therein. The stopper 15 is secured to the base such that the upper surface of the stopper is flush with the upper surface of the base 10. The stopper 15 is provided with guide wall means 16 extending in the direction of the movement of the chain C on the upper surface thereof and at the opposite sides. Stop wall means 17 is also formed on the upper surface of the stopper 15 so as to extend in the direction of the movement of the chain at the central portion between the guide wall means 16. The stop wall means upwardly extends beyond the upper ends of the guide wall means so that when the stopper 15 upwardly moves due to ascent of the base 10, the stop wall means 17 enters a space 7 of the fastener chan C and stops the chain by engagement between a bottom stop 8 and the surface of the upstream end of the stop wall means. When the stopper 15 upwardly moves together with the base 10, the guide wall means 16 function to regulate the position of the fastener stringers 1 in the lateral direction by retaining the turn-up 5 of each fastener tape 2 in the space between one guide wall means 16 and the stop wall means 17.

The base 10 also has a generally H-shaped hole 18 at a position opposite the ultrasonic horn 13. A punch guide 19 is fitted in the hole 18. As shown in FIG. 4, the punch guide 19 comprises a pair of prism-like posts 20 and plate-like guide wall means 21 connecting the posts. Each of the posts 20 integrally has an upwardly extending projection 22. Each of the projections 22 comprises a neck portion 23 extending continuously from the post 20 and having the same thickness as the guide wall means 21 and a lenticular shaped arresting portion 24 next to and integral with the neck portion. Steps 25 are formed on the opposite sides of the arresting portion 24.

The punch guide 19 is inserted in the guide hole 18 and fixed to the base 10 such that the upper surfaces of the posts 20 and the guide wall means 21 are flush with the upper surface of the base 10 and that vertically extending guide channels 26 are formed on the opposite sides of the guide wall means 21 for guiding punches 27. Holes 28 and 29 are formed through the base 10 and the punch guide 19 to extend from the downstream side of the base to the guide channels 26 so that thermoplastic auxiliary stock for upper stops in the form of cord like members 30 are fed through these holes. Although the punch guide 19 is shown as a separate member, it may be formed integrally with the base 10.

Each hammer 11 has a flat punch portion 31 which extends from one side of the base 10 towards the punch guide 19 and contacts the upper surface of the base 10. The hammers 11 are mounted on the base 10 so that the punch portions 31 slide on the upper surface of the base for reciprocal movement towards and away from the punch guide 19.

The chain guide 12 has, at the place opposite to the punch guide 19, an opening 32 which the projections 22 of the punch guide 19 enter and through which the end portion of the ultrasonic horn 13 extends towards the base 10.

The ultrasonic horn 13 has two-stepped elongated bosses 33 and 34 extending in the direction of the movement of the fastener chain C on the bottom end thereof as shown in FIG. 5. The width (w1) and height (h1) of the elongated boss 33 are generally the same as the width (W1) and height (H1) of the stepped portions 25 on the projections 22 of the punch guide 19, respectively and the width (w2) and the height (h2) of the elongated boss 34 are generally the same as the width (W2) and the height (H2) of the neck portions 23 of the projections 22, respectively. The length (w3) of the elongated boss 34 is generally equals to the distance (W3) between the projections 22 and the height (h2 and H2) is generally equal to the thickness of the coils 3 of the fastener elements.

The punches 27 are mounted for vertical movement in unison with the base 10 as well as for vertical movement relative to the base. The upper surfaces of the punches 27 are formed into grooves having arched cross section. When the punches 27 rise relative to the base, they cut the leading portions of the cord-like members 30 which extend in the guide channels 26.

The fastener chain C is intermittently transported between the base 10 and the chain guide 12 from the upper left to the lower right as seen in FIG. 3 with the bottom stops 8 leading the associated coil portions 3 of the fastener elements. Upper stops are formed when the chain is stopped.

The operation of the upper stop forming apparatus will now be explained with reference to FIGS. 6A to 6D.

Figure 6A:
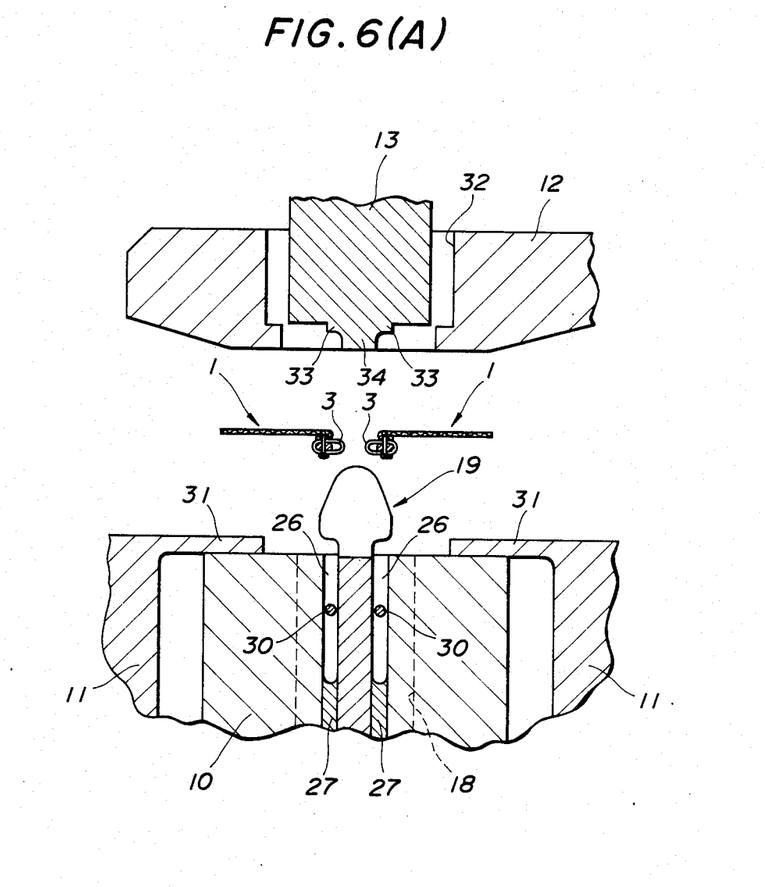
FIGS. 6A to 6D are sectional views of the upper stop forming apparatus sequentially showing the operation of the apparatus.

When the fastener chain C is stopped, the chain guide 12 and the ultrasonic horn 13 are retracted from the base 10 and the hammers 11 have moved so that the punch portions 31 are retracted from the punch guide 19 as shown in FIG. 6A. In this condition, the cord-like members 30 of the auxiliary stock have been fed so that their leading ends extend in the guide channels 26.

Figure 6B:
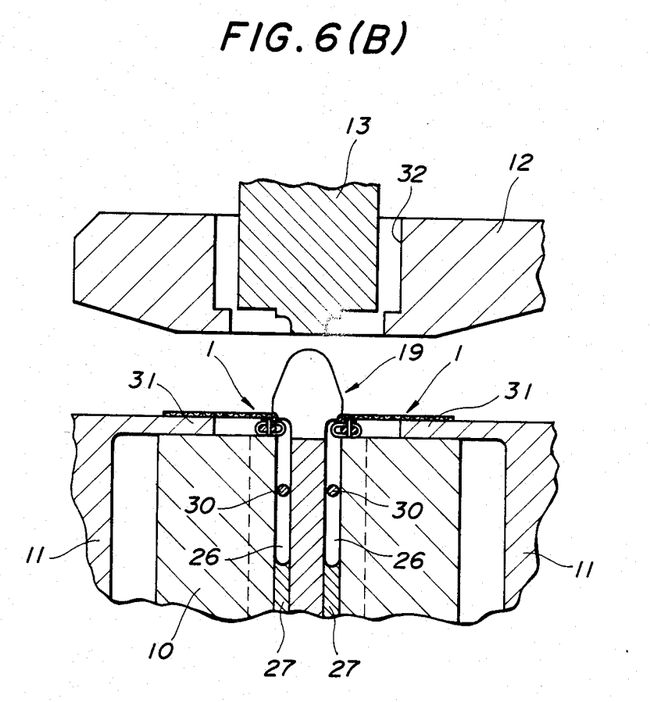

Starting with this condition, the base 10 is first upwardly moved together with punches 27 and the hammers 11. By this operation, the projections 22 of the punch guide 19 pass between the fastener stringers 1 and extend beyond them resulting in the coils 3 of the fastener elements contacting the upper surface of the base 10 and the fastener tapes 2 contacting the upper surface of the hammers 11 as shown in FIG. 6B. The stop wall means 17 functions to acurately register the fastener chain by engaging the bottom stop 8.

Figure 6C:
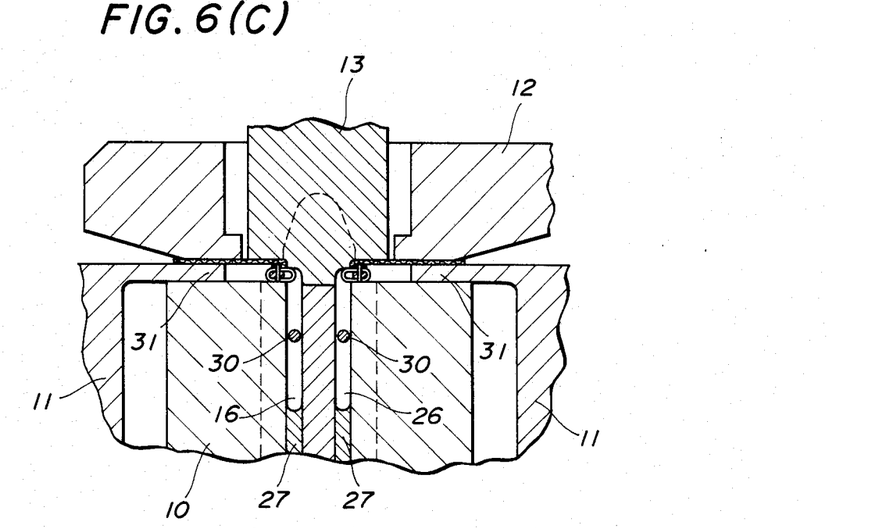
Figure 6D:
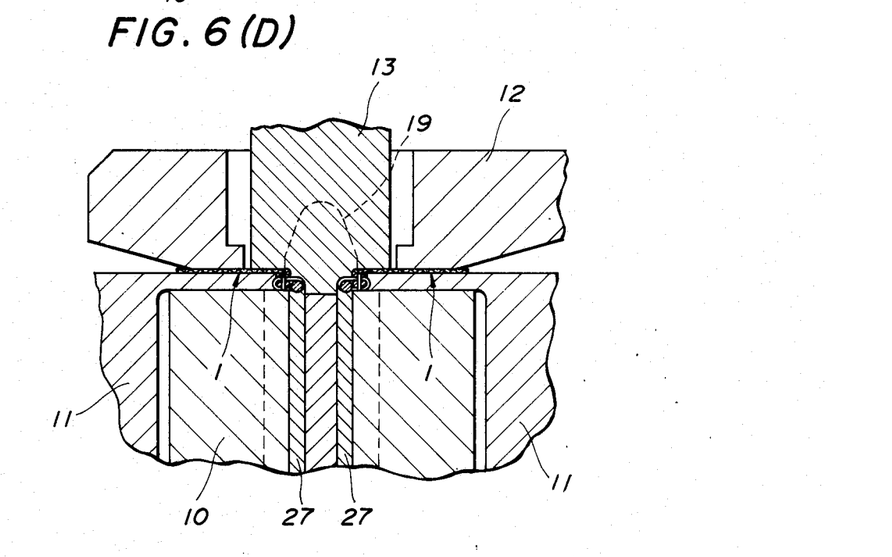

Then, the chain guide 12 and the ultrasonic horn 13 are downwardly moved. As this occurs, the chain guide 12 contacts the upper side of the fastener tapes 2 as shown in FIG. 6C. In this condition, the lower end portion of the ultrasonic horn 13 fits between the projections 22 of the punch guide 19 so that the lower surface of the elongated boss 33 contacts the upper surfaces of the fastener elements of the coils 3 and the lower surface of the elongated boss 34 contacts the upper surface of the guide wall means 21 of the punch guide 19. In this connection, the chain guide 12 contacts the fastener tapes 2 with a weak force preventing the fastener tapes from being strongly compressed between the chain guide and the upper sufraces of the hammer 11. Similarly, the ultrasonic horn 13 contacts the coils 3 of the fastener elements with a weak force preventing the fastener elements from being strongly compressed between the horn and the upper surface of the base 10.

Then the hammers 11 are driven so that the operative ends of the punch portions 31 urge the coils 3 in the direction away from the leg portions and towards the interengaging head portions of the fastener elements. Then, the punches 27 rise relative to the base 10 to cut the leading portions of the cord-like members 30 of the auxiliary stock of upper stops and press the cut portions together with the coils against the elongated boss 33 of the ultrasonic horn 13. As is described above, the height (H2) of the neck portions 23 of the projections 22 of the punch guide 19 and the height (h2) of the elongated boss 34 of the ultrasonic horn 13 are generally equal to the thickness of the coils. Therefore, when the punch portions 31 of the hammers 11 urge the coils 3, the coils 3 are expelled from the fastener tapes 2 with the element-mounting-side margins of the fastener tapes 2 being engaged and arrested by the side surfaces of the stepped portions 25 of the projections 22 of the punch guide 19 and the elongated boss 33 of the ultrasonic horn 13. As a result, the interengaging heads of the fastener elements of the coils 3 are exposed from the element-mounting-side margins of the fastener tapes 2.

Figure 7:
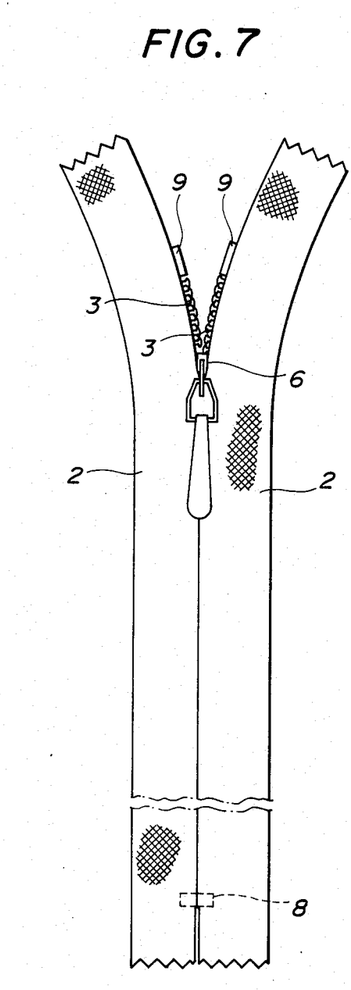
FIG. 7 is a plan view of a completed concealed type slide fastener.
Figure 8:
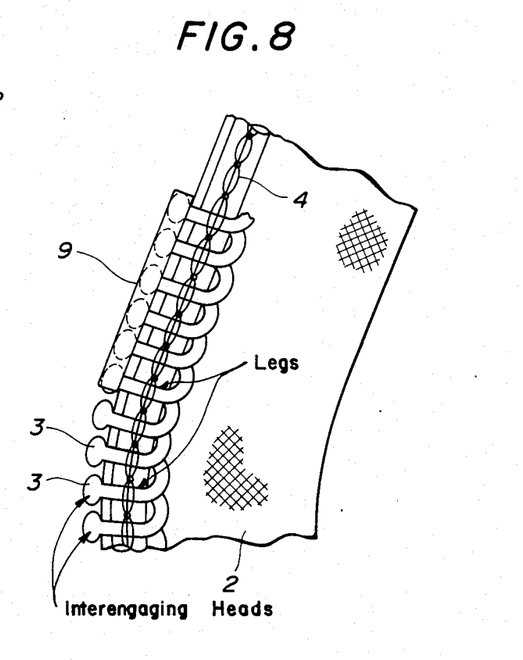
FIG. 8 is an enlarged view of an upper stop formed on the slide fastener shown in FIG. 7.

Ultrasonic wave energy is transmitted to the ultrasonic horn 13 in this condition in which the interengaging heads of the fastener elements are exposed from the element-mounting-side margins of the fastener tapes 2. By this operation, the interengaging heads of the elements between the projections 22 of the punch guide 19 are fused together with the length of the cord-like-members 30 of the auxiliary stock to form the upper stops 9 as shown in FIGS. 7 and 8.

Then, the base 10 together with the hammers 11 and the punches 27 is lowered and the chain guide 12 and the ultrasonic horn 13 rise. While the base 10 is being lowered, the cord-like members 30 of the auxiliary stock are fed so that the leading portions thereof extend in the guide channels 26. Thereafter, the fastener chain C is fed by a predetermined distance and another cycle for forming the next upper stop begins.

What is claimed is:

1. A method of forming upper stops of a concealed type slide fastener comprising a pair of fastener stringers each consisting of a fastener tape having a turn-up along one side thereof and a row of fastener elements of thermoplastic resin secured to the turn-up, each fastener element having an interengaging head and leg portion secured to the turn-up the method comprising:

providing a punch guide on a base, said punch guide having a pair of spaced projections and each of said projections having opposite sides provided with stepped portions, respectively;

placing the projections so that the projections pass between the stringers;

urging the fastener elements on each of the fastener stringers in the direction away from said leg portions and towards said interengaging heads of the elements while the element-mounting-side margin of the tape is engaged and arrested by the associated stepped portions of the projections thereby exposing said interengaging heads of the elements extending between the projections from said margin; and fusing the interengaging heads of the elements extending between said projections of form the upper stops.

2. A method according to claim 1 wherein said interengaging heads of the fastener elements are fused together with auxiliary stock for the upper stops.

3. An apparatus for forming upper stops on a concealed type slide fastener chain comprising a pair of continuous fastener stringers each consisting of a fastener tape having a turn-up along one side thereof and fastener elements of thermoplastic resin secured to the turn-up, each fastener element having an interengaging head and leg portion secured to the turn-up, the apparatus comprising:

means for transporting said fastener chain in a predetermined path;

a base provided along said path of the fastener chain for vertical movement towards and away from the fastener chain and having a pair of guide channels vertically formed in the base on the opposite sides of the centerline of said path of the fastener chain;

a pair of punches mounted for vertical movement in said guide channels, respectively;

an ultrasonic horn provided on the side opposite to said base with respect to said path of the fastener chain and for vertical movement;

projections formed on said base on the upstream and downstream sides of said guide channels such that the projections are inserted between the pair of stringers when the base is raised; and hammers provided on the opposite sides of the path of the fastener chain and each having a punch portion overlying the base and reciprocating towards and away from said projections such that when it moves towards said projections it urges the elements of the fastener stringer in the direction away from the leg poritons and towards the interengaging heads of the elements, said projections having portions which engage and arrest the element-mounting-side margins of the fastener tapes when said elements are urged towards the projections and said ultrasonic horn having portions which press the elements extending between said projections against said punches in their raised positions.

4. An apparatus according to claim 3 wherein said base is formed with holes extending from the outside of the base to said guide channels for passing cord-like members of auxiliary stock for the upper stops to the guide channels, said punches being adapted to cut the leading portions of the cord-like members when they are raised.

5. An apparatus according to claim 3 wherein said ultrasonic horn also has portions which, when the horn is in its lowered position and when said elements are urged towards the projections, engage and arrest the element-mounting-side margins of the fastener tapes.

* * * * *